US005739184A

United States Patent [19]
Marbry et al.

[11] Patent Number: 5,739,184
[45] Date of Patent: Apr. 14, 1998

[54] THERMOSETTING RESIN COMPOSITIONS

[75] Inventors: David L. Marbry, Westby; David R. Duller, Waukesha, both of Wis.

[73] Assignee: National Starch and Chemical Company, Bridgewater, N.J.

[21] Appl. No.: 767,754

[22] Filed: Dec. 17, 1996

Related U.S. Application Data

[63] Continuation of Ser. No. 539,393, Oct. 5, 1995, abandoned.

[51] Int. Cl.$^6$ .............................. C08K 3/20; C08L 63/00
[52] U.S. Cl. .................... 523/403; 523/457; 523/459; 524/437
[58] Field of Search ............................ 523/457, 459, 523/403; 524/437

[56] References Cited

U.S. PATENT DOCUMENTS 4,221,839  9/1980  De Graf .................................. 428/413
4,749,434  6/1988  Harrison ................................ 156/306.9

FOREIGN PATENT DOCUMENTS

| 0 165 207 A1 | 5/1985 | European Pat. Off. . |
| 51-83234 | 7/1976 | Japan . |
| 61-223715 | 9/1986 | Japan . |
| 3-251650 | 3/1991 | Japan . |
| 4-147896 | 5/1992 | Japan . |

*Primary Examiner*—Karen A. Dean
*Attorney, Agent, or Firm*—Ernest G. Szoke; Wayne C. Jaeschke; Martin G. Meder

[57] ABSTRACT

The present invention relates to thermosetting resin compositions which may be used in the automotive industry as sealants to coat steel substrates. The thermosetting resin composition contains an epoxy resin, a rosin, an organometallic compound and, optionally, an elastomeric and/or thermoplastic polymeric binder.

38 Claims, No Drawings

THERMOSETTING RESIN COMPOSITIONS

This application is a continuation of application Ser. No. 08/539,393, filed on Oct. 5, 1995, now abandoned.

FIELD OF THE INVENTION

The present invention relates to thermosetting resin compositions which may be used in the automotive industry as sealants for steel substrates.

BACKGROUND OF THE INVENTION

Thermosetting resin compositions are used in various applications for coating and/or sealing substrates of various composition. For example, thermosetting sealing compositions containing a novolak phenol resin, an epoxy resin, a metal salt polymer and an inorganic filler are reported for use in preparing molding materials. Cationic electrodeposition paint compositions containing a resin which contains a hydroxy group and a cationic group, an epoxy resin which contains an average per molecule of 2 or more epoxy-group-containing functional groups with a structure in which the epoxy group is directly bonded to an allcyclic skeleton and/or a bridged allcyclic skeleton, and at least one metal compound selected from hydroxides of metal elements with atomic numbers of 25 to 340 or 40 to 42 and metal salts of organic acids have been reported. Thermosetting resin compositions also have been reported for molding by inside-the-mold coating. Such resins contain at least one compound selected from unsaturated carboxylic acid (anhydride) monomers and unsaturated carboxylic acid metal salts.

Many of the thermosetting resin compositions known are two-part systems which require separate packaging for the different components, with subsequent combination of the components just prior to use. One-package, shelf-stable, thermosetting systems also are known. Such compositions are designed to provide a stable material under room temperature or refrigerated storage conditions, yet cure at elevated temperatures to provide strong adhesion and resistance to environmental conditions. By stable it is meant that the compositions am stable from premature curing during storage. In such one-package systems, curing agents are used. Examples of such curing agents include amine salts, blocked Lewis acids, acid anhydrides, dicyandiamide, adducts of epoxidized tertiary amines and imidazoles.

Thermosetting resins are used in the auto industry as sealants for various substrates. Among the various substrates are included uncoated oily steel substrates, such as galvanized steel substrates and cold-rolled-steel substrates. It would be advantageous to develop a thermosetting resin which exhibits improved adhesion to such substrates, while at the same time providing the material produced therefrom with resistance to environmental conditions, i.e., a tougher film with better adhesion.

SUMMARY OF THE INVENTION

The present invention is directed to a thermosetting resin composition having improved adhesion to steel substrates. The thermosetting resin composition comprises an epoxy resin., a rosin, and an organometallic compound, all components being present in amounts effective to provide the thermosetting resin compositions with improved adhesion to steel substrates compared to a thermosetting resin composition which does not comprise the epoxy resin, the rosin and the organometallic compound in such effective amounts. The thermosetting resins optionally, but preferably, comprise a binder selected from the group consisting of elastomeric and thermoplastic polymers.

DETAILED DESCRIPTION OF THE INVENTION

One of the essential components in the thermosetting resin compositions of the present invention is an epoxy resin which is suitable for adhesive and coating encapsulation applications. Such epoxy resins typically are polymeric in nature and have multiple epoxide functionality. Preferably, the epoxide equivalent weights of the epoxy resins range from about 150 to 4,000, preferably from about 175 to 550. The epoxy resins may be either polyglycidyl derivatives of aromatics or heteroaromatics, such as pre-extended polyglycidyl ethers of 2,2-bis-(4'hydroxyphenyl)propane (bisphenol A). Other epoxy resins which are obtained from polyphenol compounds and epichlorohydrin also may be used. Particularly preferred epoxy resins are bisphenol A diglycidol ether-based and bisphenol A epichlorohydrin-based epoxy polymers, either alone or in combination. Such epoxy resins are disclosed in JP Application No. 41-47896 (Katayama et al.), JP Application No. 51-83234 (Shibayama et al.), JP Application No. 61-223715 (Sawai) and U.S. Pat. No. 4,749,434, the content of which is incorporated herein by reference as if set forth in its entirety. The thermosetting resin compositions comprise an amount of the epoxy resin which is effective to provide the thermosetting resin composition with improved adhesion to substrates such as those disclosed herein. Typically, the thermosetting resin composition will comprise from about 1 to about 65 percent weight percent of the epoxy resin, preferably from about 2 to about 40 weight percent of the epoxy resin, and more preferably from about 2 to about 10 weight percent of the epoxy resin, based on the total weight of the thermosetting resin composition.

The second essential component to the present invention is a rosin used in amounts effective to improve the adhesion and toughness of the films formed from the thermosetting resin compositions. Rosin, as used herein, is intended to include unmodified rosin, modified rosin and rosin esters. The rosins used herein maybe derived from any of those rosin sources known to those skilled in the art and include gum rosins, wood rosins and tall oil rosins. Rosins typically are composed of complex mixtures of high molecular weight organic acids and related neutral species with the predominate resin acid being abietic acid. The rosin may be modified to inhibit oxidation, which may adversely affect molecular weight and solvency. Useful chemical modifications include polymerization, oligomerization and preferably hydrogenation or dehydrogenation. Preferable rosin resins utilized herein are derivatives of rosin which have been esterified at the carboxyl group with a polyhydric alcohol to form thermoplastic resinous rosin esters. Exemplary alcohols include without limitation ethylene glycol, diethylene glycol and triethylene glycol. In certain embodiments glycerol or pentaerythritol polyhydrics are used to esterify the rosin resins. A preferred rosin ester is a glycerol ester of partially hydrogenated wood rosin. The rosin may be combined with the binder prior to combining the binder and rosin with the epoxy and the organometallic compound. Alternately, the rosin may be added to the thermosetting resin composition after all of the other ingredients have been incorporated therein. The thermosetting resin composition comprises from about 5 to about 95 percent of the rosin, preferably from about 8 to about 75 weight percent, and more preferably from about 8 to about 20 weight percent of the rosin, based on the total weight of the thermosetting resin composition.

A third essential component of the thermosetting resin composition of the present invention is an organometallic compound in amounts effective to provide the thermosetting resin composition with improved adhesion to substrates such as those disclosed herein. Such organometallic compounds comprise an organic moiety derived from a compound selected from the group consisting of a $C_3$–$C_{32}$ monocarboxylic acid or derivative thereof, a $C_3$–$C_{13}$ phenol, a $C_3$–$C_{13}$ naphthol and a $C_5$–$C_{12}$ 1,3-diketone. The organometallic compounds also will comprise a metal selected from the group consisting of magnesium, calcium, barium, tin, aluminum, antimony and zinc. Preferred metal organometallic compounds include aluminum or magnesium stearate, aluminum or zinc acetylacetonate, zinc diacrylate, zinc dimethacrylate and zinc monomethacrylate. The thermosetting resin compositions will comprise from about 0.01 to about 50 weight percent of the organometallic compound, preferably from about 0.25 to about 25 weight percent of the organometallic compound, and more preferably from about 0.5 to about 10 weight percent of the organometallic compound, based on the total weight of the thermosetting resin composition.

A fourth optional, but preferred, component of the thermosetting resin of the present invention is a binder selected from the group consisting of elastomeric and thermoplastic polymers. Exemplary elastomeric binders include styrene butadiene rubber, polybutadiene rubber, nitrile rubbers, polyvinyl chloride, butyl rubber, halogenated butyl rubber, ethylene-propylene, including copolymers and terpolymers thereof; and neoprene, including copolymers and terpolymers thereof. Exemplary thermoplastic polymers include polyethylene and its copolymers and terpolymers, A-B-A block polymers such as Kraton® rubbers, amorphous polypropylene and its copolymers, poly ester resins and polyurethanes. The thermosetting resins of the present invention may comprise up to about 93 weight percent of the binder, preferably from about 5 to about 50 weight percent of the binder, and preferably from about 8 to about 20 weight percent of the binder, based on the total weight of the thermosetting resin composition.

Auxiliary materials further may be incorporated into the thermosetting resin compositions to modify properties such as viscosity, tack and adhesion to specific substrates. For example, lower molecular weight plasticizers may be added to further adjust viscosity, tack and flexibility of the resins and films formed therefrom. Exemplary plasticizers include paraffinic oils, naphthenic oils, phthalates, adipates, aromatic oils and low molecular weight polymers. Levels of use will depend upon such factors as the particular binder or binders chosen, the level of use of such binders, the level of use of optional filler material, the particular plasticizer chosen, and the like. Such plasticizers generally are know by those skilled in the art and are used at levels typically used by those skilled in the art. When used, the plasticizers are used at levels ranging from about 2 to about 50, weight percent, preferably from about 5 to about 25 weight percent, based on the total weight of the thermosetting resin composition.

The thermosetting resin compositions of the present invention may also utilize as fillers organic and/or inorganic powders and fibers incorporated therein to adjust physical properties of the resin, including porosity, density, tensile, modulus, elongation, color and viscosity properties. Examples of such fillers include calcium carbonate, magnesium calcium silicate, aluminum silicate, silica, mica, barium sulfate, graphite, carbon black and others, including mineral rubber, wood cellulose and calcium silicate. When used, the fillers typically are used at levels ranging from about 2 to about 75 weight percent, preferably from about 25 to about 70 weight percent, based on the total weight of the thermosetting resin composition.

The thermosetting resin compositions of the present invention exhibit both hot-melt and pressure-sensitive adhesive properties and may be used as coatings in general, and specifically may be used as adhesives and sealants. Other additives may be used to optimize those characteristics necessary for a specific application and use. For instance, expandability, block resistance, rheology, flammability, leveling and gloss may each be adjusted to meet established criteria by those skilled in the art.

In one particular application in the automotive industry, the thermosetting resin compositions may be used as sealants. For instance, in automotive manufacture, two or more distinct steel substrates may be welded together, thereby forming a seam at the welded interface. The steel substrates may be coated or uncoated, but preferably am uncoated oily steel substrates such as cold-rolled-steel (CRS) and galvanized steel substrates. By coated and uncoated, it is meant that the steel substrate either has an epoxy coating electrodeposited thereon or does not have an epoxy coating electrodeposited thereon.

The thermosetting resins of the present invention may be extruded onto an appropriate release substrate, such as release paper, in the form of predetermined, preformed shapes, such as coated tape, and subsequently applied to the uncoated oily substrates at the welded seam. The exact dimensions and form of the shape will be determined by the particular substrates to which the thermosetting resins are to be applied. Typical methods of sealing such seams or joints are disclosed in U.S. Pat. No. 4,749,434, in the name of Harrison, the contents of which are incorporated herein by reference as if set forth in its entirety.

The thermosetting resin must provide not only sufficient adhesion to the substrates, but also must possess sufficient cohesion to maintain the internal integrity of the sealant applied to the substrate. Additionally, the sealant must provide the substrate with resistance from environmental factors such as salt spray. Finally, the cured surface of the formed material must be essentially tack-free. Accordingly, the inventive thermosetting resin compositions of the present invention provide pressure sensitive adhesive products which have sealant properties and which combine the desirable characteristics of 1) a tack-free cured surface, 2) cohesive peel adhesion failure (indicating improved adhesion), 3) yet with sufficient cohesive properties as indicated by shear strength, and 4) environmental resistance.

The following examples and embodiments are not intended to limit the scope and breadth of the invention, which scope and breadth may be limited only by the claims appended hereto.

EXAMPLES

Bulk Material Preparation:

Examples 1–17, thermosetting resin compositions which may function as thermosetting sealants in the automotive industry, were prepared according to the following general procedure, with the ingredients and the levels actually utilized in each Example being reflected in Tables 1–4. The following materials were blended together over a period of 1.25 hours in a water-jacketed Sigma-Blade Mixer at 82° C. (180° F.).

| | |
|---|---|
| Styrene Butadiene Rubber | 100 grams |
| Naphthenic Oil | 40 |
| Carbon Black | 0.7 |
| P-Styrenated Diphenylamine | 5.3 |
| Glycerol Ester of Partially Hydrogenated Wood Rosin | 99.6 |
| Calcium Carbonate | 215.3 |
| Talc | 68 |
| Fumed Silica | 8 |

The materials were added to the mixer at a rate and order familiar to those experienced in the art of preparing thermosetting sealants to maintain a consistent mixture and to maximize dispersion and mixing characteristics. The batch temperature was reduced with application of cold water to the jacket. The batch was subsequently reduced in viscosity by adding the following:

| | |
|---|---|
| Naphthenic Oil | 100.0 |

Viscosity reduction also allows greater control of batch temperature. Below a temperature of 49° C. (120° F.), the following materials were blended into the mixture:

| | |
|---|---|
| Epichlorohydrin Bisphenol A Epoxy Resin | 37.3 |
| Zinc Diacrylate | 27.8 |

The sealant was then vacuumed while mixing to eliminate entrained air to produce a smooth homogeneous bulk material.

EVALUATION OF SEALANT PROPERTIES

Shelf-stability:

Stability of the thermosetting resin compositions was evaluated at 25° C. (77° F.), using a 100 gram needle per ASTM D5-73. Results are reported as Penetration (mm).

Adhesion:

Adhesion evaluations were obtained by preparing 0.030"×1"×4" test pads by compressing the sealant material at 140 Kg/cm$^2$ (2000 psi) for five (5) minutes between sheets of release paper. The preformed test pads were applied to CRS and electro-galvanized steel substrates and baked in an electric or gas forced air oven at 176° C. (350° F.) for 30 minutes. The baked pads then were peeled from the substrate and the mode of failure noted as adhesive or cohesive, i.e. the failure was at the pad/substrate interface or within the body of the test pad.

Cohesion:

Lap shears were made with a bond line thickness of 0.030 inch and an overlap of 1 inch$^2$ from samples prepared as above. The samples then were cured using an electric or gas oven as above. Upon cooling and conditioning at room temperature for a minimum of one hour, the samples were evaluated using an Instron or equivalent with a crosshead speed of 2 inch/minute.

Salt Spray:

The thermosetting sealants were evaluated for salt spray resistance according to ASTM B117-90.

Evidence of corrosion under the sealant, loss of adhesion, or other effects are determined by removing the sealant after exposure and visually examining the substrates.

Examples 1–3 were evaluated to compare thermosetting compositions of the present invention to compositions which do not contain an organometallic compound. The results are set forth in Table 1.

TABLE 1

| EXAMPLE | 1 | 2 | 3 |
|---|---|---|---|
| Styrene Butadiene Rubber | 100 | 100 | 100 |
| Naphthenic Oil | 140 | 140 | 140 |
| Carbon Black | 1 | 1 | 1 |
| p-Styrenated Diphenylamine | 5 | 5 | 5 |
| Calcium Carbonate | 215 | 215 | 215 |
| Talc | 68 | 68 | 68 |
| Precipitated Silica | 8 | 8 | 8 |
| Dicyandiamide | 2.5 | 2.5 | 2.5 |
| 4,4'Methylene Bis (Phenyl Dimethylurea) | 0.26 | 0.26 | 0.26 |
| Zinc Diacrylate | — | 28 | 28 |
| Glycerol Ester of Partially Hydrogenated Wood Resin | 100 | 100 | 100 |
| Epichlorohydrin/ Bisphenol A Epoxy | 37 | 37 | 37 |
| Dicumyl Peroxide | — | — | 2.8 |
| PENETRATION: Initial (mm) | 16.9 | 14.1 | — |
| PENETRATION: 2 Weeks (mm) | 14.9 | 10.8 | — |
| PENETRATION: 4 Weeks (mm) | 13.4 | 10.4 | — |
| APPEARANCE: Surface Tack and Cure | little cure; soft and Gummy | dry surface without tack; toughened | increased toughness; less apparent elongation |
| SALT SPRAY RESISTANCE: CRS | Pass | Pass | — |
| SALT SPRAY RESISTANCE: GALVANIZED | Pass | Pass | — |

As indicated by the data in Table 1, the thermosetting resin composition of the present invention provides a cured sealant with a virtually tack-free and toughened surface compared to thermosetting compositions which do not contain the organometallic compound in combination with the epoxy resin and the rosin.

Examples 4–8 were evaluated to compare thermosetting resins according to the present invention to compositions which contained no epoxy resin. Results are set forth in Table 2.

TABLE 2

| EXAMPLE | 4 | 5 | 6 | 7 | 8 |
|---|---|---|---|---|---|
| Styrene Butadiene Rubber | 100 | 100 | 100 | 100 | 100 |
| Naphthionic Oil | 140 | 140 | 140 | 140 | 140 |
| Carbon Black | 1 | 1 | 1 | 1 | 1 |
| p-Styrenated Diphenylamine | 5 | 5 | 5 | 5 | 5 |
| Calcium Carbonate | 215 | 215 | 215 | 215 | 215 |
| Talc | 68 | 68 | 68 | 68 | 68 |
| Precipitated Silica | 8 | 8 | 8 | 8 | 8 |
| Dicyandiamide | — | 2.5 | 2.5 | 2.5 | — |
| 4,4'Methylene Bis (Phenyl Dimethylurea) | — | — | 0.26 | 0.26 | — |
| Zinc Diacrylate | 27 | 27 | 27 | 27 | 27 |
| Glycerol Ester of Partially Hydrogenated Wood Resin | 100 | 100 | 100 | 100 | 100 |
| Epichlorohydrin/Bisphenol A Epoxy | — | — | — | 37 | 37 |
| Peel Adhesion Failure Mode | Adhesive | Adhesive | Adhesive | Cohesive | Cohesive |

As the data in Table 2 indicates, those compositions which do not contain the epoxy resin, the rosin, and the organometallic compound suffer adhesive failure at the substrate/sealant interface, while those thermosetting resin compositions of the present invention experience cohesive failure. The fact that the failure is cohesive versus adhesive indicates improved adhesion.

Examples 9 and 10 were evaluated to determine the effects of post-adding the rosin to the thermosetting composition by melting the rosin into the thermosetting resin system at 65° C. (150° F.).

TABLE 3

| EXAMPLE | 9 | 10 |
|---|---|---|
| Styrene Butadiene Rubber | 100 | 100 |
| Naphthionic Oil | 220 | 220 |
| 4,4'Methylene Bis (Phenyl Dimethylurea) | 5 | 5 |
| Iron Powder | 100 | 100 |
| Graphite | 225 | 225 |
| Calcium Carbonate | 280 | 280 |
| Zinc Diacrylate | 20 | 20 |
| Glycerol Ester of Partially Hydrogenated Wood Resin | — | 100 |
| Epichlorohydrin/Bisphenol A Epoxy | 37 | 37 |
| APPEARANCE: Surface Tack and Cure | good adhesion; very tacky and soft | excellent toughness; surface tack reduction |
| PENETRATION: Initial | 14.2 | 15.1 |
| LAP SHEAR: Electro-Galvanized Steel, Kg/cm² (lb/in²) | 1.45 (20.6) | 6.04 (85.9) |
| LAP SHEAR: CRS, Kg/cm² (lb/in²) | 1.40 (20.0) | 5.46 (77.7) |

As the data in Table 3 indicate, post-addition of the rosin to the thermosetting composition is just as effective in improving the adhesion of the inventive compositions as is adding the rosin to the binder prior to adding the epoxy and organometallic compound.

Examples 11-17 were evaluated for toughness and adhesion. Results are set forth in Table 4.

TABLE 4

| EXAMPLE | 11 | 12 | 13 | 14 | 15 | 16 | 17 |
|---|---|---|---|---|---|---|---|
| Styrene Butadiene Rubber | 100 | 100 | 100 | 100 | 100 | 100 | 100 |
| Naphthionic Oil | 200 | 200 | 200 | 200 | 200 | 200 | 200 |
| 4,4'Methylene Bis (Phenyl Dimethylurea) | 6 | 6 | 6 | 6 | 6 | 6 | 6 |
| Calcium Carbonate | 350 | 350 | 350 | 350 | 350 | 350 | 350 |
| Zinc Diacrylate | 2.7 | 8.1 | 11.2 | 17.4 | 27.0 | 27.0 | 27.0 |
| Glycerol Ester of Partially Hydrogenated Wood Resin | 100 | 100 | 100 | 100 | 100 | 100 | 100 |
| Epichlorohydrin Bisphenol A Epoxy | 50 | 50 | 50 | 50 | 50 | 75 | 75 |
| Dicumyl Peroxide | 0 | 0 | 0 | 0 | 0 | 0 | 1.6 |
| LAP SHEAR: Electro-Galvanized Steel, Kg/cm² (lb/in²) | 2.1 (30.0) | 5.1 (72.0) | 6.0 (85.6) | 6.3 (89.6) | 6.6 (94.3) | 5.9 (84.3) | 15 (211.8) |
| LAP SHEAR: CRS, Kg/cm² (lb/in²) | 2.4 (33.6) | 5.4 (76.1) | 6.1 (86.6) | 6.8 (97.1) | 7.1 (100.5) | — | — |
| Peel Adhesion Failure Mode | Cohesive | Cohesive | Cohesive | Cohesive | Cohesive | Partial Cohesive | Partial Cohesive |

We claim:

1. A thermosetting resin composition, comprising:
   an epoxy resin,
   a rosin,
   an organometallic compound comprising an organic moiety derived from a compound selected from the group consisting of a $C_3$–$C_{32}$ monocarboxylic acid or derivative thereof, a $C_6$–$C_{13}$ phenol, a $C_6$–$C_{13}$ naphthol and a $C_5$–$C_{12}$ 1,3-diketone and a metal selected from the group consisting of magnesium, calcium, barium, aluminum, antimony and zinc; and
   optionally, a binder selected from the group consisting of elastomeric and thermoplastic polymers, wherein the epoxy resin, the rosin and the organometallic compound are present at levels effective to provide the thermosetting resin composition with improved adhesion to a steel substrate.

2. The composition of claim 1 wherein the epoxy resin is selected from the group consisting of polyglycidol ether-based and epichlorohydrin-based epoxy resins.

3. The composition of claim 1 wherein the epoxy resin is selected from the group consisting of bisphenol A/diglycidol ether-based and bisphenol A/epichlorohydrin-based epoxy resins.

4. The composition of claim 1 comprising from about 1 to about 65 weight percent of the epoxy resin, based on the total weight of the thermosetting resin composition.

5. The composition of claim 1 comprising from about 2 to about 40 weight percent of the epoxy resin, based on the total weight of the thermosetting resin composition.

6. The composition of claim 1 comprising from about 2 to about 10 weight percent of the epoxy resin, based on the total weight of the thermosetting resin composition.

7. The composition of claim 1 wherein the rosin is selected from the group consisting of an unmodified rosin, a modified rosin and a rosin ester.

8. The composition of claim 7 wherein the rosin is a rosin ester.

9. The composition of claim 8 wherein the rosin ester is a glycerol ester of a partially hydrogenated wood rosin.

10. The composition of claim 1 comprising from about 5 to about 95 weight percent of the rosin, based on the total weight of the thermosetting resin composition.

11. The composition of claim 1 comprising from about 8 to about 75 weight percent of the rosin, based on the total weight of the thermosetting resin composition.

12. The composition of claim 1 comprising from about 8 to about 20 weight percent of the rosin, based on the total weight of the thermosetting resin composition.

13. The composition of claim 1 wherein the organometallic compound is aluminum stearate.

14. The composition of claim 1 wherein the organometallic compound is magnesium stearate.

15. The composition of claim 1 wherein the organometallic compound is aluminum acetylacetonate.

16. The composition of claim 1 wherein the organometallic compound is zinc acetylacetonate.

17. The composition of claim 1 wherein the organometallic compound is zinc diacrylate.

18. The composition of claim 1 wherein the organometallic compound is zinc dimethacrylate.

19. The composition of claim 1 wherein the organometallic compound is zinc monomethacrylate.

20. The composition of claim 1 comprising from about 0.01 to about 50 weight percent of the organometallic compound, based on the total weight of the thermosetting resin composition.

21. The composition of claim 1 comprising from about 0.25 to about 25 weight percent of the organometallic compound, based on the total weight of the thermosetting resin composition.

22. The composition of claim 1 comprising from about 0.5 to about 10 weight percent of the organometallic compound, based on the total weight of the thermosetting resin composition.

23. The composition of claim 1 wherein said binder is present and is selected from the group consisting of styrene butadiene rubber, polybutadiene rubber, nitrile rubbers, polyvinyl chloride, butyl rubber, halogenated butyl rubber, ethylene-propylene polymers, neoprene polymers, polyethylene and copolymers and terpolymers thereof, A-B-A block polymers, amorphous polypropylene and copolymers thereof, polyesters and polyurethanes.

24. The composition of claim 1 comprising from about 5 to about 50 weight percent of the binder, based on the total weight of the thermosetting resin composition.

25. The composition of claim 1 comprising from about 8 to about 20 weight percent of the binder, based on the total weight of the thermosetting resin composition.

26. The composition of claim 1 further comprising an ingredient selected from the group consisting of a plasticizer and a filler.

27. The composition of claim 24 comprising from about 2 to 40 weight percent of the epoxy resin, from about 0.25 to about 25 weight percent of the organometallic compound; and about 8 to about 75 weight percent of the rosin, based on the total weight of the thermosetting resin composition.

28. The composition of claim 25 comprising from about 2 to about 10 weight percent of the epoxy resin, from about 0.5 to about 10 weight percent of the organometallic compound; and about 8 to about 20 weight percent of the rosin, based on the total weight of the thermosetting resin composition.

29. The composition of claim 26 comprising from about 8 to about 20 weight percent of the binder, from about 2 to about 10 weight percent of the epoxy resin, from about 0.5 to about 10 weight percent of the organometallic compound; and about 8 to about 20 weight percent of the rosin, based on the total weight of the thermosetting resin composition.

30. The composition of claim 1 wherein the steel substrate is an uncoated oily substrate.

31. The composition of claim 1 wherein the steel substrate is selected from the group consisting of cold-rolled steel and galvanized steel substrates.

32. A method of sealing a steel substrate, comprising:
   applying to the steel substrate a thermosetting resin composition which comprises an
   epoxy resin,
   a rosin,
   an organometallic compound comprising an organic moiety derived from a compound selected from the group consisting of a $C_3$–$C_{32}$ monocarboxylic acid or derivative thereof, a $C_6$–$C_{13}$ phenol, a $C_6$–$C_{13}$ naphthol and a $C_5$–$C_{12}$ 1,3-diketone and a metal selected from the group consisting of magnesium, calcium, barium, aluminum, antimony and zinc; and optionally
   a binder selected from the group consisting of elastomeric and thermoplastic polymers, wherein the epoxy resin, the rosin and the organometallic compound are present at levels effective to provide the thermosetting resin composition with improved adhesion to the steel substrate.

33. The method of claim 32 wherein the thermosetting resin composition comprises:

from about 1 to about 65 weight percent of the epoxy resin selected from the group consisting of polyglycidol ether-based and epichlorohydrin-based epoxy resins, from about 5 to about 95 weight percent of the rosin selected from the group consisting of an unmodified rosin, a modified rosin and a rosin ester, from 0.01 to about 50 weight percent of the organometallic compound comprising an organic moiety derived from a compound selected from the group consisting of a $C_3$–$C_{32}$ monocarboxylic acid or derivative thereof, a $C_6$–$C_{13}$ phenol, a $C_6$–$C_{13}$ naphthol and a $C_5$–$C_{12}$ 1,3-diketone and a metal selected from the group consisting of magnesium, calcium, barium, aluminum, antimony and zinc; and from 0 to about 93 weight percent of the binder selected from the group consisting of styrene butadiene rubber, polybutadiene rubber, nitrile rubbers, polyvinyl chloride, butyl rubber, halogenated butyl rubber, ethylene-propylene polymers, neoprene polymers, polyethylene and copolymers and terpolymers thereof, A-B-A block polymers, amorphous polypropylene and copolymers thereof, polyesters and polyurethanes, all weight percents based on the total weight of the thermosetting composition.

34. The method of claim 32 wherein the thermosetting resin composition comprises:

from about 2 to about 40 weight percent of the epoxy resin selected from the group consisting of polyglycidol ether-based and epichlorohydrin-based epoxy resins, from about 8 to about 75 weight percent of the rosin selected from the group consisting of an unmodified rosin, a modified rosin and a rosin ester, from about 0.25 to about 25 weight percent of the organometallic compound comprising an organic moiety derived from a compound selected from the group consisting of a $C_3$–$C_{32}$ monocarboxylic acid or derivative thereof, a $C_6$–$C_{13}$ phenol, a $C_6$–$C_{13}$ naphthol and a $C_5$–$C_{12}$ 1,3-diketone and a metal selected from the group consisting of magnesium, calcium, barium, aluminum, antimony and zinc, from 5 to about 50 weight percent of the binder selected from the group consisting of styrene butadiene rubber, polybutadiene rubber, nitrile rubbers, polyvinyl chloride, butyl rubber, halogenated butyl rubber, ethylene-propylene polymers, neoprene polymers, polyethylene and copolymers and terpolymers thereof, A-B-A block polymers, amorphous polypropylene and copolymers thereof, polyesters and polyurethanes, from 0 to about 50 weight percent of a plasticizer; and from 0 to about 75 weight percent of a filler, all weights based on the total weight of the thermosetting resin composition.

35. The method of claim 32 wherein the steel substrate is selected from the group consisting of cold-rolled steel and galvanized steel substrates.

36. The method of claim 32 wherein said organometallic compound is zinc diacrylate.

37. The method of claim 32 wherein said organometallic compound is zinc dimethacrylate.

38. The method of claim 32 wherein said organometallic compound is zinc monomethacrylate.

* * * * *